United States Patent [19]
Klose

[11] 3,974,953
[45] Aug. 17, 1976

[54] SELF-CENTERING FEED CONVEYOR
[75] Inventor: Karl W. Klose, Findlay, Ohio
[73] Assignee: Cooper Tire and Rubber Company, Findlay, Ohio
[22] Filed: Mar. 11, 1975
[21] Appl. No.: 557,339

[52] U.S. Cl. .............................. 226/189; 226/198; 226/199; 271/240
[51] Int. Cl.² ........................................ B65H 23/16
[58] Field of Search ..................... 271/240, 171; 226/189–198, 199

[56] References Cited
UNITED STATES PATENTS

| 2,365,322 | 12/1944 | Ashworth | 226/199 X |
| 2,528,106 | 10/1950 | Albrecht | 271/240 |
| 3,061,303 | 10/1962 | Glaser et al. | 271/240 X |
| 3,854,315 | 12/1974 | Winkler | 226/198 X |

Primary Examiner—Evon C. Blunk
Assistant Examiner—Bruce H. Stoner, Jr.
Attorney, Agent, or Firm—Kemon, Palmer & Estabrook

[57] ABSTRACT

An apparatus for centering material fed therethrough consisting of a pair of outer frame members provided with a pair of inner members wherein all of the members are arranged in spaced parallel relation to one another. The inner members are pivotally connected to and carried by the outer frame members in spaced parallel relation therewith. The inner members are spring biased toward one another to compensate for varying size in material being fed therethrough and are also provided with horizontally and vertically disposed feed and guide rollers. The inner members are linked together by means of a common slide guide carried by the fixed outer frame members.

5 Claims, 4 Drawing Figures

SELF-CENTERING FEED CONVEYOR

BACKGROUND OF THE INVENTION

The present invention relates to conveyors for feeding material preferably of elongated or sheet form.

In prior devices for feeding material in either sheet or web form, it has been found that said sheets might vary in width and also that one web of material may be joined to another web of different width. Such variance in the width of material being fed by a conveyor necessitates a constant adjustment of the conveyor guide means to facilitate the centered passage of the material therethrough. Quite often the adjustment of the guide means was carried out by a hand operation such as by rotating a wheel connected to a suitable screw member which is provided with a nut that is designed to effect the separation or drawing towards one another of the guide means of a feed conveyor structure. In such devices which utilize a hand operated adjusting mechanism, the guide means might be readily separated from one another to facilitate and permit the passage of a web of material therethrough of a certain width, but then when material of a smaller width is being fed through the conveyor, it was quite often done so without any manual adjustment of the guide means so as to move the guide means towards one another to insure that the material is being properly fed on center by the conveyor apparatus. Such a situation occurs quite frequently when the operator of a machine makes an initial adjustment to separate the guide means from one another to permit the passage of a web or sheet of material of certain size through the feed conveyor and then if material of a smaller width is subsequently fed through said conveyor, the guide means are not manually adjusted towards one another so that the material is simply permitted to move through the feed conveyor in a sloppy manner so that the delivery of the material is not carried out in an accurate manner when accuracy of delivery of said material is one of the essential requirements of the feed conveying apparatus.

SUMMARY OF THE INVENTION

The present invention is directed to the concept of providing a feed conveyor that is readily capable of automatic adjustment to compensate for varying widths in the web or sheet of material that is being fed through said conveyor. In the feed conveyor embodying the present inventive concept, a web of material having a certain width can be connected to another web of material of a different width, and in the feeding of said webs of material through the conveyor structure of the present invention, the difference in the widths of the two webs will be automatically compensated for through the self-centering or adjusting characteristics as embodied in the conveyor structure of the present invention.

As a manner of illustrating the foregoing concept let it be assumed that the feed conveyor of the present invention is being utilized in feeding belts of material employed in the fabrication of a radial-ply belted tire. The belts of material are usually cut on a bias from sheets of material and said cut pieces are then joined in end-to-end relation so as to provide a long web of material that is usually wound into roll form for delivery to the tire building drum. In the cutting of the material and the joining of the various pieces in end-to-end relation, the resultant web might have slight variations in width. Inasmuch as it is highly essential that said material be delivered to the tire building drum in a manner for accurately positioning same upon the expanded carcass or tire body, it becomes extremely important that the feed conveyor mechanism should be readily capable of not only accurately feeding the material but also to compensate for any variations in width during the feeding operation by centering said material within the intended dimensional specification, thereby distributing any dimensional variation equally about the intended dimensional centerline.

The conveyor structure of the present invention is readily capable of feeding material in either sheet or web form in a manner so as to conform to the foregoing requirements, and the web or sheet of material is automatically centered in the conveyor feed structure regardless of differences in the width of said sheet or web of material that is being fed therethrough.

DESCRIPTION OF THE PREFERRED EMBODIMENT

Figure 1:
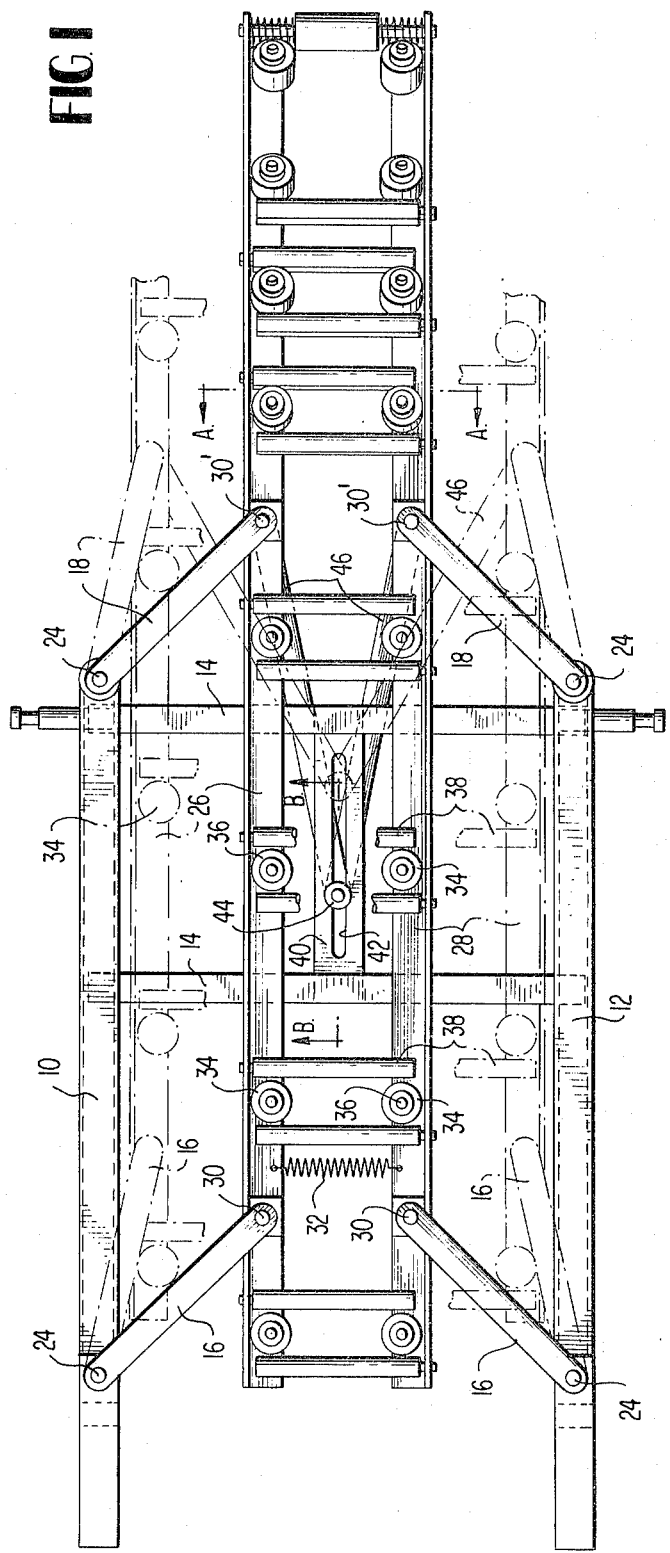
FIG. 1 is a plan view of the self-centering feed conveyor of the present invention.
Figure 2:
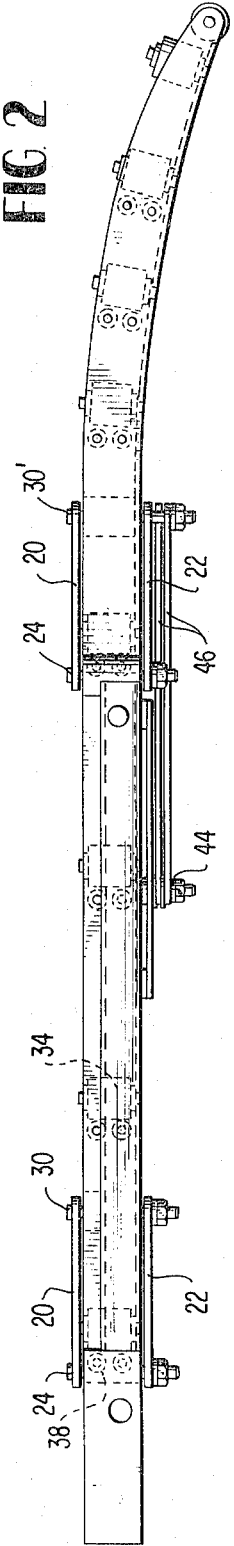
FIG. 2 is a side elevational view of the feed conveyor shown in FIG. 1.
Figure 4:
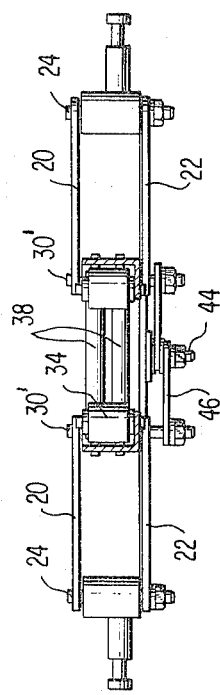
FIG. 4 is a detailed sectional view of a portion of the feed conveyor, the view being taken on the line A—A of FIG. 1.

There is shown in FIG. 1 an outer frame consisting of side frame elements 10 and 12 which are maintained in spaced parallel relation to one another by means of cross braces 14. The side frame members 10 and 12 may be of box or channel configuration and have, pivotally mounted thereon, a plurality of arms 16 and 18. Each of the various arms are of the same type of construction and consist of a top plate member 20, FIG. 2, and a bottom plate member 22. The plate members 20 and 22 each have one end thereof pivotally connected to the side frame members 10 and 12 by means of suitable pins 24, while the free or distal ends of said plate members are pivotally connected to inner frame members 26 and 28 by means of pins 30 and 30'. The inner frame members 26 and 28, as carried by the arms 16 and 18, are positioned between the outer frame members 10 and 12 and due to the pivotal mounting of the arms 16 and 18 upon the pins 24 and 30, the inner frame members 26 and 28 are capable of movement toward and away from one another and toward and away from the outer frame members 10 and 12.

The inner frame members 26 and 28 are connected by a transverse spring member 32 which tends to urge said frame members into closer proximity with respect to one another. The inner frame members 26 and 28 are each provided with a plurality of longitudinally spaced vertically disposed guide rollers 34. These rollers are mounted in the inner frame members 26 and 28 by means of suitable pins 36. The inner frame members 26 and 28 are preferably of angular configuration with the openings of said angles facing one another so as to receive therein the guide rollers 34. In addition, the inner frame members 26 and 28 have mounted therein a plurality of longitudinally spaced horizontally disposed feed rollers 38. The feed rollers 38 are mounted to the inner frame members 26 and 28 in a cantilevered manner and the rollers in the inner frame member 26 are offset or staggered with respect to the rollers 38 that are mounted in and carried by the inner frame member 28. Through this arrangement the inner frame members 26 and 28 may be drawn towards one another through the action of the spring 32 without any danger of the feed rollers of one inner frame member striking or interfering with the feed rollers carried by the other frame member.

Figure 3:
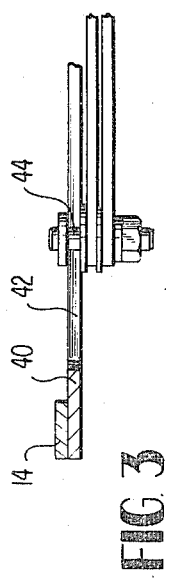
FIG. 3 is a detailed vertical sectional view of a portion of the feed conveyor, the view being taken on the line B—B of FIG. 1.

The cross braces 14 carried by the outer frame members 10 and 12 are connected to one another by means of a plate member 40 which is provided with a longitudinally extending slot 42. The slot 42 has slidably disposed therein a pin member 44, FIG. 3, and said pin member has pivotally connected thereto a pair of diagonally disposed arms 46. The free ends of said arms 46 are pivotally connected to the inner frame members 26 and 28 by means of the pins 30' which are utilized also to connect the ends of the arms 18 to said inner frame members. Thus, the arms 16 and 18 in conjunction with the diagonally disposed arms 46 support the inner frame members with respect to the outer frame members and maintain said inner frame members in spaced parallel relation to one another during any movement of said inner frame members.

In the use of the conveyor of the present invention the inner frame members 26 and 28 are connected to the outer frame members 10 and 12 by the arms 16 and 18 as well as the arms 46. The spring 32 tends to maintain the inner frame members in relatively close proximity to one another in the manner as shown in FIG. 1. Upon the feeding of a sheet or web of material through the conveyor the edges of said material would engage the guide rollers 34 as it moved over the feed rollers 38 and the width of said sheet or web of material would thus determine the spacing between the inner frame members 26 and 28. The movement of the inner frame members towards or away from one another as dictated by the width of the sheet or web of material engaging the guide rollers 34 is carried out by the arms 16–18–46 with a compensatory movement of the pin 44 in the slot 42 of the plate member 40.

The ability of the guide rollers 34 of the inner frame members to engage the edges of the sheet or web of material and to maintain said engagement results in the sheet or web of material being centered with regard to the outer frame members. The manner in which the inner frame members are suspended with respect to the outer frame members when taken in conjunction with the action of the spring 32 on the inner frame members enables said guide rollers 34 to center the material being fed therethrough even though the width of said material is not constant.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A conveyor comprising a pair of fixed outer members arranged in spaced parallel relation to one another and at an equidistance from a center line between said members, a pair of automatically self centering inner members arranged in spaced parallel relation to one another and positioned between said outer members, means carried by said inner members for receiving and conveying a strip of material of varying width, a plurality of arm members pivotally connecting said inner members to said outer members, at least one resilient member interconnecting said inner members for urging said inner members into engagement with the edges of said strip of material, means carried by said outer members and interconnecting said inner members to cause an equal but opposite displacement of said inner members in relation to said center line.

2. A conveyor as set forth in claim 1 wherein said feed rollers are secured to said inner members in a cantilevered manner with the rollers carried by one of the inner frame members being staggered with respect to the rollers carried by the other inner frame member.

3. A conveyor as set forth in claim 1 wherein said inner members are connected to and carried by said outer members by a plurality of said arm members that have their respective ends pivotally connected to said inner and outer members.

4. A conveyor as set forth in claim 3 wherein said last named means include brace elements connected by a plate member having an elongated slot therein, a pin slidably mounted in said slot and a pair of diagonally disposed arms having one end connected to said pin and the other end connected to said inner frame members and an end of certain of said arm members.

5. A conveyor as set forth in claim 1 wherein said inner members are provided with a plurality of vertically disposed guide rollers.

* * * * *